United States Patent
Horigane

(10) Patent No.: US 6,653,123 B2
(45) Date of Patent: Nov. 25, 2003

(54) PROCESS FOR PRODUCING PROCESSED ORGANIC PRODUCT AND APPARATUS THEREFOR

(75) Inventor: Akira Horigane, Tsukuba (JP)

(73) Assignees: Tsukuba Food Science, Inc., Ibaraki (JP); National Agricultural Research Organization, Ibaraki (JP)

( * ) Notice: Subject to any disclaimer, the term of this patent is extended or adjusted under 35 U.S.C. 154(b) by 337 days.

(21) Appl. No.: 09/746,182

(22) Filed: Dec. 21, 2000

(65) Prior Publication Data

US 2001/0006811 A1 Jul. 5, 2001

(30) Foreign Application Priority Data

Dec. 28, 1999 (JP) .......................................... 11-373736

(51) Int. Cl.7 ............................................... C12M 1/02
(52) U.S. Cl. ................................ 435/290.2; 435/290.4; 241/DIG. 38
(58) Field of Search ...................... 241/46.013, DIG. 38; 366/298, 323; 435/290.1–290.4

(56) References Cited

U.S. PATENT DOCUMENTS

| 2,947,524 A | | 8/1960 | Bridges | |
|---|---|---|---|---|
| 5,123,600 A | * | 6/1992 | Takenaka | ............... 241/46.013 |
| 5,256,378 A | * | 10/1993 | Elston | ..................... 435/290.2 |
| 5,377,921 A | * | 1/1995 | Wirth | ........................... 241/29 |
| 5,405,780 A | * | 4/1995 | Hamilton, Jr. | ........... 435/290.2 |
| 5,583,045 A | * | 12/1996 | Finn | ........................ 435/290.1 |
| 5,630,944 A | * | 5/1997 | Terblanche | ................. 210/768 |

FOREIGN PATENT DOCUMENTS

| EP | 0 730 025 A | 9/1996 | ............ C12M/1/02 |
|---|---|---|---|
| GB | 583 654 | 12/1946 | |

\* cited by examiner

*Primary Examiner*—David A. Redding
(74) *Attorney, Agent, or Firm*—Flynn, Thiel, Boutell & Tanis, P.C.

(57) ABSTRACT

A process and apparatus for producing a processed organic product containing organic matters having a superior nutrient balance and exhibiting high performances in water retention and gas permeation. The process involves supplying the raw material 26 containing organic fibrous substance to a reactor 1 provided therein with a plurality of main screws 6, 7 arranged side by side so as to confront the peripheral edges of the screw threads of neighboring screws with each other such that each acts to forward the reaction mixture in substantially the same direction at a velocity different from each other, effecting a biological or biochemical reaction therein while subjecting the organic fibrous substance to axial splitting and breaking by the main screws 6, 7 and taking out a processed organic product via a processed product exit port 31, which is then dewatered in a dewatering means 35 before being dried in a dryer 38 to obtain the processed product in a dried solid form.

9 Claims, 6 Drawing Sheets

PROCESS FOR PRODUCING PROCESSED ORGANIC PRODUCT AND APPARATUS THEREFOR

FIELD OF THE INVENTION

The present invention relates to a processed organic product obtained by processing a raw material containing fibrous organic substances of, for example, organic wastes, such as agricultural residues, food residues and industrial organic wastes given off from factories, through a physico-chemical reaction and a biological or a biochemical reaction, as well as to a process and an apparatus for producing it.

BACKGROUND OF THE INVENTION

While agricultural residues, food residues and industrial organic wastes given off from factories have hitherto been disposed of by, for example, incineration, landfill, dumping into the sea and so on, they cause environmental pollution and are undesirable. These organic wastes contain various components, such as nitrogen sources, hydrocarbons, minerals and fibrous organic substances. In order to reclaim these components as a processed organic product in a form of food product ingredients, medicinal ingredients, fodder raw materials, industrial raw materials or soil conditioner raw materials, it is necessary to convert them into a corresponding product having physical properties and a chemical composition adapted to each specific purpose, while removing pollutant virulent bacteria, such as pathogenic *Escherichia coli, Salmonella, Cryptosporidium* and so on. In order to convert the components, such as nitrogen sources, hydrocarbons, minerals and fibrous organic substances, into a raw product suitable for use in food or fodder having well-balanced contents of nutrient components, it may be adapted to have recourse to a biological or biochemical reaction utilizing a useful microorganism, wherein, however, removal of detrimental microbes is difficult by merely relying on the antagonistic interaction between microorganisms.

For the removal of detrimental microorganisms, use of ordinary techniques, such as use of bactericides, pasteurization and so on, is inadequate for eliminating pollution by microorganisms within the organic wastes, as these techniques are only difficultly effective for decomposing solid matters, such as fibrous substances. A heating sterilization using an autoclave or dry heat sterilization may often lead to thermal decomposition of useful components, such as vitamins, etc.

The insoluble components, such as fibrous substances, contained in organic wastes may be utilized as nutrients exhibiting the third functionality. The reclaimed nutrients reveal inferior gustative performance, since the organic wastes may often have been subjected to lignification, so that a product of dietary fiber exhibiting physico-chemical properties suitable for food materials or fodder is difficultly obtainable from organic wastes by ordinary techniques.

The final residue composed of insoluble high molecular weight substances, such as aromatic high polymeric materials and fibrous high polymers, left after extraction of useful components from the organic wastes by ordinary treating practices is in general in a form of a dense mass of powder or pellets and, therefore, is poor in the capabilities of being aerated and of retaining water, so that soil microbes can hardly grow and proliferate therein. For this reason, the final residue is hardly utilized as a soil conditioner or the like and, therefore, has heretofore been subjected to a chemical treatment by sodium sulfite or brought to incineration.

It is considered ideal to admix undamaged foreign soil rich in organic components and in living healthy soil microbes with a land for improving the agricultural productivity or for restoring the land, such as flooded agricultural land with lost surface soil, land becoming a desert, land injured by salt damage or blighted land. In fact, however, reclamation of agricultural land is realized in most cases by bringing mountain soil containing sand and clay onto the land, since soil or better quality and rich in humus, as found in a broadleaves forest, is difficult to obtain in a large quantity. This land reclamation with mountain soil may often form compacted dense soil blocks after being tread down by cultivating vehicles and so on to build up water-impervious zones, since the mountain soil have a low content of organic matter, and are not adapted for the growth of soil microbes with lower air permeability and water-retentiveness, resulting in inferior aspects in germination rate and in root growth, together with simplification of the soil ecosystem, whereby decreased resistance to injurious microorganisms is brought about with the accompaniment of poor agricultural productivity.

On repeated cultivation of identical crops over several years, the land will suffer from proliferation of injurious organisms, such as nematodes, phytopathogenic bacteria, viruses and insects. For preventing damage by these injurious organisms, use of agricultural chemicals and rotation of crops may be effective. However, there is a demand for crops without using agricultural chemicals or with a reduced use of chemicals in view of growing public interest in the prevention of injuries from agricultural chemicals, so that use of such chemicals should be avoided. Cabbage, white rape, broccoli and the like, which constitute main vegetable crops, belong to the same family as Cruciferae and are prohibitive for crop rotation. In the past, stalks, leaves, roots and so on of such crops are disposed of by incineration for prevention of spread of blights. From the point of view of environmental pollution, however, incineration is problematic, so that an innovative technique for eliminating injurious organisms is needed.

For improving soils having a poor organic matter content, application of organic compost to the soil has been practiced, however, preparation of compost results in an accompanying difficulty in stabilizing the composition thereof and may often suffer from superfluity of nitrogen and phosphate. In addition, when the fermentation of the compost is insufficient, proliferation of injurious organisms, such as pathogenic coliform bacilli, Salmonella, pathogenic parasites and so on, prevails, which may occasionally provide a cause for unfavorable human disorders of food poisoning and the like via crops.

In a practice of preparing organic manure, a compost may be prepared by subjecting excrement of livestock to spontaneous fermentation, wherein it is difficult, however, to control the maturation and the composition and, if the maturation is insufficient, the compost will rot after application to the field to thereby produce ammonia and hydrogen sulfide injurious to young seedlings with the simultaneous breaking down of the microbiotic balance in the soil, giving birth to a fear of occasional pollution of the soil by pathogenic microbes and others. The so-called compost method, in which food residues and so on are subjected to the action of a useful microorganism, such as actinomycetes, nitrogen fixation bacterium, mold fungus or so on, is simple and convenient, but may also suffer from difficulty in the control of maturation and the composition with concomitant fear of proliferation of pathogenic bacteria, as in the compost preparation technique mentioned above.

For subjecting organic substances to a biological or biochemical reaction under utilization of a microorganism, enzyme or so on, a bioreactor has been proposed (Japanese Patent Kokai Hei 8-228762), wherein a plurality of screws, each provided with a screw thread which is arranged at the same pitch with each other but in a helicoid of reverse turn to each other, are disposed side by side in the reactor and each rotated in a rotational sense reverse to that of the neighboring screw so as to draw the contents of the reactor in between the confronting screw threads to thereby force them up- and downwards, whereby the reactor contents are subjected to an action of axial tearing, breaking down and agitation. By this reactor, however, fibrous tissues may not sufficiently be subjected to the actions of axial tearing and breaking and may sometimes be left unbroken, which may be due to the construction of the screws in which they each have a screw thread of the same pitch and are rotated so as to guide the reactor contents in the same direction.

SUMMARY OF THE INVENTION

An object of the present invention is to provide a processed organic product and a process and an apparatus for producing such a processed organic product, in which fibrous tissues contained in the raw organic material can be loosened, split and subjected to a breaking action to thereby cut them into short fragments and, further, to biological or biochemical partial digestion, so that raw materials containing longer fibrous organic substances, such as plant bodies, can be used directly for the processing and subjected to a physico-chemical reaction and a biological or biochemical reaction, whereby it is made possible to produce a processed organic product which contains organic matter having a superior nutrient balance while excluding injurious microorganisms and possesses better water retentive performance and better gas permeability.

The present invention resides in a processed product of organic material and in a process and an apparatus for producing the product, as given below:

(1) A process for producing a processed organic product, comprising
   supplying a raw material containing a fibrous organic substance to a reactor provided therein with a plurality of main screws arranged side by side so as to confront the peripheral edges of the screw threads of neighboring screws with each other such that each acts to forward the reaction mixture at a velocity different from each other and
   effecting a biological or biochemical reaction therein while subjecting the fibrous organic substance to splitting and breaking by the main screws.
(2) The process as defined in the above (1), wherein cooperative screws operative to forward the reaction mixture in the direction opposite to the forwarding direction caused by the main screws are arranged neighboring the delivery end of the main screws, so as to permit the processed product to be taken out in a compressed state.
(3) The process as defined in the above (1) or (2), wherein auxiliary screw(s) operative to forward the reaction mixture in the opposite direction to that caused by the main screws are arranged neighboring the main screws to facilitate the convection of the reaction mixture.
(4) The process as defined in any one of the above (1) to (3), wherein the reaction is an anaerobic or aerobic reaction.
(5) A processed organic product obtained by a biological or biochemical reaction of a raw material containing a fibrous organic substance in a reactor provided therein with a plurality of main screws arranged side by side so as to confront the peripheral edges of the screw threads of neighboring main screws with each other such that each acts to forward the reaction mixture at a velocity different from each other, while supplying the raw material to the reactor so as to subject the fibrous organic substance to splitting and breaking by the main screws.
(6) An apparatus for producing a processed organic product, comprising
   a reactor for effecting a biological or biochemical reaction,
   a raw material supply port for supplying a raw material containing a fibrous organic substance to the reactor,
   a plurality of main screws arranged in the reactor side by side so as to confront the peripheral edges of the screw threads of neighboring main screws with each other such that each acts to forward the reaction mixture at a velocity different from each other and
   a processed product exit port disposed on the reactor so as to permit the processed product to be taken out at a location neighboring the delivery end of the main screws.
(7) The apparatus as defined in the above (6), wherein the reactor is disposed in an inclined or horizontal posture, with the plurality of main screws being arranged along the lower wall face of the reactor.
(8) The apparatus as defined in the above (6) or (7), wherein neighboring main screws have helical screw threads and are rotated in reverse rotational sense to each other.
(9) The apparatus as defined in any one of the above (6) to (8), wherein the main screws are designed to forward the reaction mixture at different velocities for each screw by selecting the configuration of the screw thread, its pitch and/or the rate of screw revolution.
(10) The apparatus as defined in any one of the above (6) to (9), wherein cooperative screws operative to forward the reaction mixture in the direction opposite to the forwarding direction caused by the main screws are arranged neighboring the delivery end of the main screws.
(11) The apparatus as defined in any one of the above (6) to (10), wherein auxiliary screw (s) operative to forward the reaction mixture in the opposite direction to that caused by the main screws are arranged neighboring the main screws.
(12) The apparatus as defined in any one of the above (6) to (11), wherein the reactor is furnished with installation (s) having vacant spaces for supporting microorganisms.

DETAILED DESCRIPTION OF THE INVENTION

Figure 1:
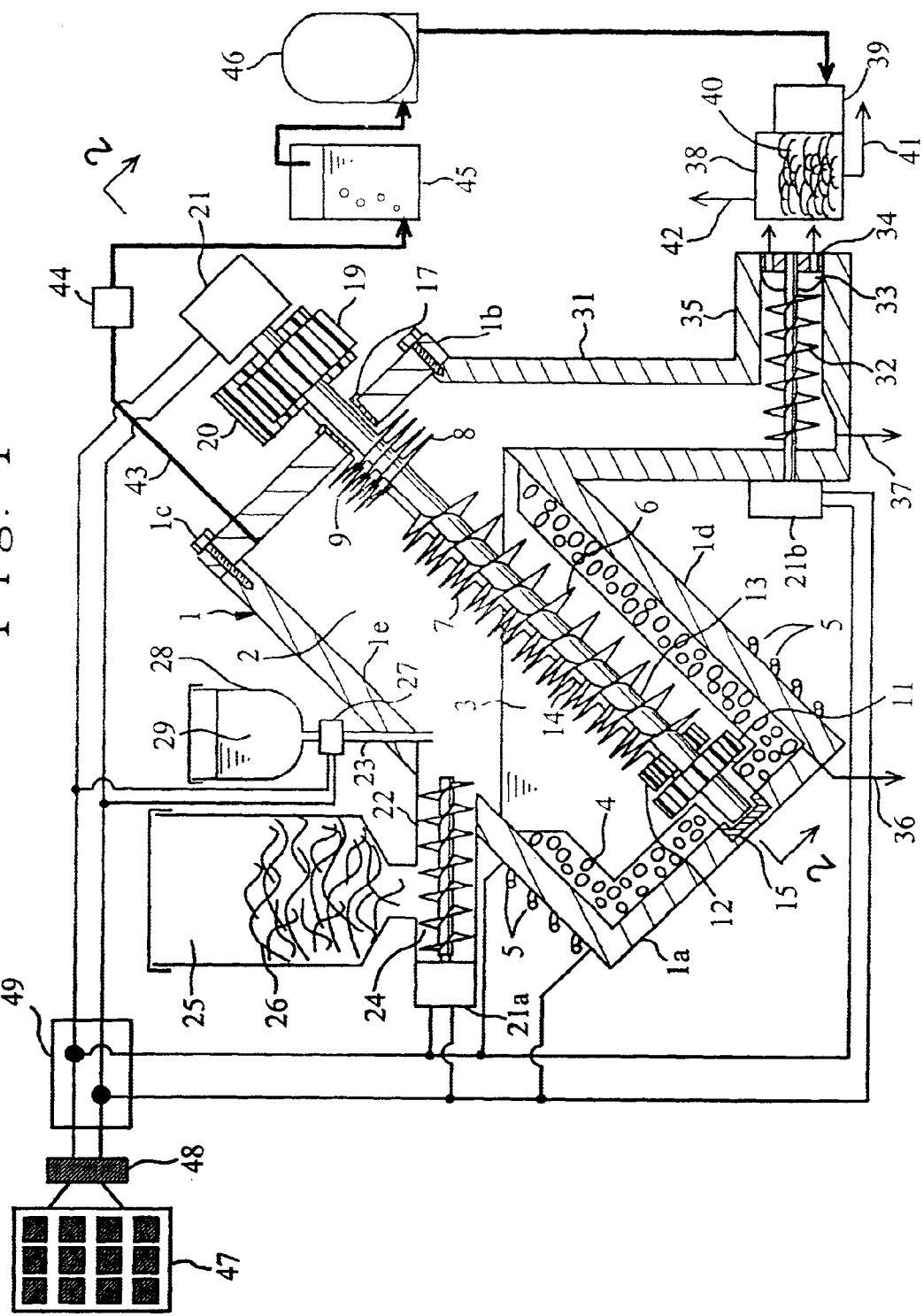
FIG. 1 shows an embodiment of the apparatus for producing the processed organic product according to the present invention in a vertical sectional view.

According to the present invention, the raw material for the reaction is selected preferably among those containing a fibrous organic substance, especially a biodegradable fibrous organic substance. As the fibrous organic substance, there may be enumerated organic fibrous materials, for example, high molecular weight fibrous materials, such as cellulose and the like, and aromatic high polymeric substances, such as lignin and the like. For the source of these organic substances, there may be exemplified plant tissues, such as stalks, leaves, branches, roots, husks and shells; food residues, such as food rests and remnants of meals; and organic industrial wastes, such as wood chips, beet pulp, spent wood-chopsticks and wasted paper products. They may be employed as such or after having been cut into an appropriate size. Those polluted with pathogenic or virulent microbes or with injurious insects may be processed as such without pretreatment. Besides these raw materials containing a fibrous organic substance, organic materials containing no fibrous substance and inorganic materials may also be used as the raw material for the reaction.

The reactor for realizing the bioreaction for the raw material may be of any type so long as it permits the installation of a reaction chamber internally, wherein preference is given to one in which the reaction chamber is constructed as a cylinder disposed in an inclined or horizontal posture. The reactor is provided with a raw material supply port, a processed product exit port, a gas discharge port, drain ports and so on. The raw material supply port and the gas discharge port are disposed at upper portions of the reactor and the processed product exit port is arranged so as to communicate with the delivery region from the main screws, while the drain ports are disposed at lower portions of the reactor. In all these charge and discharge elements, means for transference and control, such as a conveyer, a pump, valves, stoppers and so on, are incorporated adaptively in accordance with each specific substance to be transferred.

It is favorable to furnish the reactor over the inner wall face thereof with structural installation(s) of a substance having vacant spaces for supporting microorganisms. For the substance having vacant spaces, use of a porous body, such as a ceramic, may be favored, while aggregated textile materials and piled nets may also be useful. The void or pore size thereof may be 2–10 mm, with a preference to communicating pores.

The reactor may favorably be furnished with an agitating means and a heating means for facilitating the biological or biochemical reaction, wherein a solar battery and the gas produced in the reactor may be used for the energy source. The gas produced in the reactor is withdrawn via the gas discharge port and can be utilized by combustion for heating and for gas-power generation after having been subjected to removal of gasified components, such as fragrant components, hydrogen sulfide, etc. in a gas purification unit and to recovery of non-combustible carbon dioxide as a liquefied product or as dry ice for enrichment with high energy components, such as methane and hydrogen. Further, the reactor may preferably be provided also with a culture medium supply unit so as to promote an efficient biological or biochemical reaction.

Inside the reactor, a plurality of main screws are arranged side by side so as to confront the peripheral edges of the screw threads of neighboring main screws with each other such that each acts to forward the reaction mixture at a velocity different from each other. While the reaction mixture may be forwarded by the main screws either in substantially the same direction or in the reverse direction to each other, it may preferably be forwarded in the direction towards the processed product exit port. While the main screws may be arranged at any adapted position within the reaction chamber, it is favorable to arrange them along the lower inside face of an obliquely or horizontally disposed reaction chamber. In the case of an oblique arrangement, the reaction mixture is forwarded obliquely towards an upper site of the reaction chamber, where the processed product exit port may be disposed, in order to thereby carry out the reaction while scraping up the material to be processed, which tends to sediment to the bottom of the chamber, so as to impart a splitting action and a breaking-down action to the fibrous substances in the raw material to obtain a split and broken processed product via the exit port. When the reaction chamber is disposed with a slight inclination or in horizontal posture, a spontaneous convection of the reaction mixture may hardly be caused and, hence, it is favorable to provide the reaction chamber at a portion adjacent to the main screws, preferably between the main screws, with one or more auxiliary screws operative to forward the reaction mixture away from the processed product exit port, in order to cause a compulsory convection.

When two neighboring main screws provided with screw threads of counter-helicoid to each other are employed and rotated in reverse sense rotation with each other, the portions of the reaction mixture between the screw threads of these screws are forwarded in the same direction to each other. By selecting the configurations and the pitches of the screw threads and/or the revolution rates of the screws adequately, the velocity of forwarding of the reaction mixture can voluntarily be adjusted, whereby the axial tearing, breaking down and agitation of the material to be processed can be controlled favorably by a simple mechanism. For the main screws, those which are constructed in a form in which many bevel gear wheels are each provided with grooves and put one over another may also be employed, not only those in which a continuous single helical screw thread (fin) is provided. By installing a rotating agitation means composed of, for example, spur wheel gears in combination, beneath the main screws, the reaction can be realized without being obstructed by sedimented solid matter. In the case where the screw threads of neighboring main screws have the same helical turn and are rotated in reverse sense to each other, the reaction mixture will be forwarded locally in each moving direction of each main screw, though it is forwarded as a whole towards the direction in which the prevalent amount of the reaction mixture is forwarded. When one or more auxiliary screws forwarding the reaction mixture in the direction opposite to that caused by the main screws are arranged in between the main screws, any sedimenting solids in the reaction mixture can efficiently be brought into convection.

When cooperative screws forwarding the reaction mixture in the direction reverse to that by the main screws are arranged neighboring the delivery end of the main screws and the processed product exit port is disposed at a portion at which the reaction mixture is guided out by both the main screws and the cooperative screws, it is possible to carry out the biological reaction while retaining the microorganisms contained in the reaction mixture in a highly dense population by bringing them out into the reaction chamber and to subject the reaction mixture to a squeezing action by these opposing screws, whereby the processed product can be taken out via the exit port in a form of a compressed solid mass. It is preferable to install in the processed product exit port a section for dewatering the processed product, whereby the processed product can be withdrawn in a form of dewatered solid matter. In the dewatering section, a unit in which a screw conveyer and a cutter are installed in combination may favorably be employed. When a dryer is installed for drying the dewatered product, a solid processed organic product can be obtained in a dry state. As the heat source for the dryer, the produced gas from the reactor can be utilized.

In producing the processed product of organic substance by the apparatus given above, the raw material containing organic fibrous substance is supplied to the reactor via the raw material supply port, while supplying thereto at the same time, if necessary, a suitable culture medium, whereupon the biological or biochemical reaction is effected while operating the main screws and heating the reaction mixture by the heating means. Here, the biological or the biochemical reaction may either be an aerobic or an anaerobic one, wherein preference is given, in general, to an anaerobic reaction of facultative or strict nature in view of the capability of obtaining thereby a useful processed organic product by digesting organic matters containing fibrous substances. In the reaction chamber, biological digestion of fibrous substances including cellulose, etc. increases due to a change of the culture aspect of microbes in the reaction mixture into a starvation culture contingent to the decrease in the easily digestible nutritional components in the reaction medium. An aerobic reaction may have an advantage of the apparatus having a small size, while thereby a large amount of carbon dioxide gas is evolved during consumption of the organic raw material. While the microorganisms participating in the biological or biochemical reaction can proliferate spontaneously by succeeding the reaction, they may be collected from other reaction systems or from the first stomach and lower digestive tract of bovine or sheep and may be supplied to the reactor together with the culture medium to carry out the reaction.

In the biological or biochemical reaction in the reactor, the raw material is soaked in the reaction liquor (culture medium) and the solid matter including the organic fibrous substances is subjected to splitting and breaking together with agitation by the main screws to cause mixing with the living microorganisms in the reaction liquor to effect the reaction therewith. The plurality of the main screws arranged neighboring with each other operate so as to forward the reaction mixture containing the fibrous substances at different velocities, wherein these screws act to effect splitting and cutting of the material, since their screw threads are arranged in a confronting relation to each other. Here, the forwarding velocity is different for each of the main screws, whereby the fibrous substances contained in the reaction mixture are subjected to actions by axial and rotatory forces and are loosened with simultaneous effect of axial splitting and cutting.

The fibrous substances subjected to splitting and cutting are floating suspended within the reaction mixture and are subjected to biological digestion. The processed product guided out by the main screws is exhausted via the processed product exit port while being subjected to splitting and cutting by the confronting screw threads of the neighboring main screws rotating in counter-sense to each other. When cooperative screws guiding out the reaction mixture in the direction reverse to that caused by the main screw are arranged neighboring the delivery end of the main screws, the portions of the reaction mixture guided between the screw threads of the main screws and of the cooperative screws are pressed onto each other to bring about a squeezing action on the pressed mass to expel water contained therein to thereby attain dewatering of the mass, whereby the processed product is exhausted in a compressed dewatered solid state. The portion of increment of the reaction liquor in the reactor is exhausted via the processed product exit port and via drain port(s), from which bacteria cells, cell proteins, metabolic products and so on are separated by, for example, centrifugation, and are utilized as processed organic products for industrial raw materials, food components, components of medicinal products, fodder raw materials and so on.

The biota in the reactor may vary in accordance with each specific parameter, such as raw material supplied, culture medium and reaction condition, while the biota may, in general, be established with a predominance of protozoans, cellulose-decomposing bacteria, methane bacteria, eubacteria, yeasts, fungi and so on. The organic raw material is subjected to biolysis by these microbes, wherein pathogenic microbes and injurious insects contained in the organic raw material are digested by these microbes and are made harmless.

The processed product resulting from such biological reaction is a solid mass containing lower molecular weight organic materials formed by decomposition of sugars, lipids, proteins and so on present in the organic substances in the raw material, bacteria cells and metabolic products as well as decomposition products of the loosened and broken fibrous substances, such as lignin and cellulose. The processed organic product thus contains organic substances superior in the nutrient balance for nourishing human, animals and soil microbes together with a content of hydrolyzates from polysaccharides, such as cellulose etc., and has better water-retentive and air permeating characteristics.

The processed organic product can, therefore, be used for industrial raw materials, food components, components of medicinal products and fodder raw materials and, in addition, be used for improving soils in, for example, a flooded agricultural land with lost surface soil, a land becoming a desert, a land injured by salt damage and others.

The treated product exhausted from the reactor can be utilized, as such, after having been dewatered or in a sterilized and dried form by drying, for such processed organic products. The processed organic products containing a large amount of fibrous substances, such as lignin and cellulose, may further be treated, if necessary, by growing therein earthworms or soil microbes, such as root zone bacteria, or by admixing fertilizer or culture soil thereto, in order to attain better balance of the soil biota to prepare processed organic products adapted for soil improvement.

As described above, the present invention provides a reactor furnished with a plurality of main screws arranged side by side so as to confront the peripheral edges of the screw threads of neighboring screws with each other such that each acts to forward the reaction mixture at a velocity different from the other, to which a raw material containing a fibrous organic substance is supplied and is subjected to a biological or biochemical reaction under the actions of the screws to crush the tissues of the fibrous organic substance, so that it is made possible to supply a raw material containing long fibrous substances, such as bodies of plants, to the reactor as such without any preliminary processing operation and to effect therein loosening, axial splitting and cutting of the fibrous substances into short fragments to thereby subject the raw material to efficient physico-chemical and biological or biochemical reactions, whereby injurious microbes are removed and processed organic products containing organic substances superior in the nutritional balance to serve as, for example, industrial raw materials, food components, components for medicinal products, fodder raw materials and raw materials for soil improving agents, and revealing high abilities for retaining water and for permeating gases, can be produced.

THE BEST MODE FOR EMBODYING THE INVENTION

Below, embodiments of the present invention are described with reference to the appended Drawings.

Figure 2:
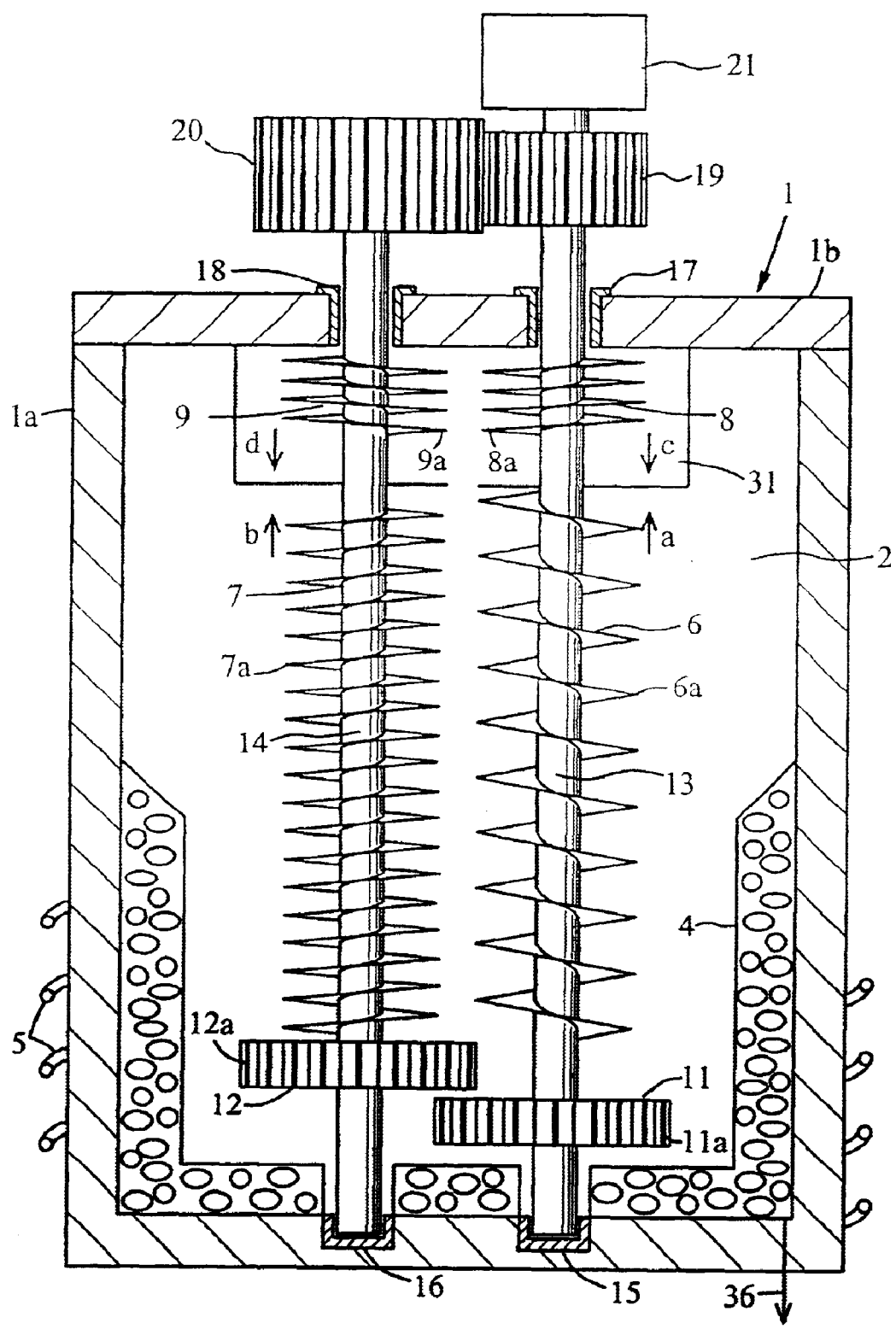
FIG. 2 is the section along the line 2—2 of FIG. 1.

In the embodiment shown in FIGS. 1 and 2, the reactor 1 comprises a cylindrical reactor body 1a disposed at an inclination angle of 30°–60°, having internally a reaction chamber 2 for effecting therein a biological reaction under anaerobic condition and provided with a lid 1b fixed by fixing means 1c. The reaction chamber 2 is lined internally over the region contacting with the reaction mixture 3 by a porous lining 4 made of a ceramic. The porous lining 4 has communicating pores of sizes in the range from 2 to 10 mm. A heater 5 constituted of an electric heating wire is disposed on the outer circumference of the reactor body 1a.

In the reactor 1, two main screws 6 and 7 are disposed in parallel along the inclined lower wall 1d in such a manner that each screw is soaked at its lower part in the reaction mixture 3. These main screws 6 and 7 are formed each with a helical screw thread 6a or 7a of counter-helical turn to each other, in such a manner that the peripheral edges of the screw threads 6a and 7a confront each other. The helical pitch of the thread 7a is settled to be twofold as large as that of the thread 6a.

At a portion neighboring the delivery end of the main screws, namely, on the upper side of the screw shaft 13 or 14 of each main screw 6 or 7, a cooperative screw 8 or 9 is provided, of which screw thread 8a or 9a has a helical turn of reverse sense to that of the corresponding main screw. Each shaft 13 or 14 of the main screw 6 or 7 is provided at its lower end with a gear 11 or 12 having teeth 11a or 12a cut parallel to the shaft 13 or 14, respectively. These cooperative screws are located on the shafts 13 and 14, respectively, so as to stand in opposition to each other. The lower end of each shaft 13 or 14 is supported on a bearing 15 or 16. The upper part of each of the shafts 13 and 14 protrudes above the lid 1b passing through a bearing 17 or 18 and is provided with a gear 19 or 20. The upper end of the screw shaft 13 is connected to an electric motor 21.

The main screws 6 and 7 and the cooperative screws 8 and 9 are held each rotatably and are arranged side by side, respectively, in such a relation that each screw 6 or 8 stand in opposition to each counter-screw 7 or 9 at a distance therebetween and the main screw 6 or 7 is held at a certain distance from the cooperative screw 8 or 9. While the gears 11 and 12 are designed in this embodiment to be different in their diameters, number of teeth and the locations, they may be designed to be the same in the diameter, number of teeth or location, namely, being located in the same level, in order to serve as a means for agitation and crushing. The gear 19 is in engagement with the gear 20 at a gear ratio of 2:3 so as to be rotated in reverse sense to each other at a revolution ratio of 3:2 by the electric motor 21.

A raw material supply port 22 and a culture medium supply port 23 are arranged on the inclined upper wall 1e of the reactor 1. In the raw material supply port 22, a screw conveyer 24 driven by an electric motor 21a is installed, in order to supply the raw material 26 containing fibrous organic substance from a hopper 25 to the reaction mixture 3 in the reaction chamber 2. In the culture medium supply port 23, a solenoid valve 27 is provided, which serves to control supply of a culture medium 29 from the culture medium reservoir 28 to the reaction chamber 2.

A processed product exit port 31 is provided at an upper portion of the inclined lower wall 1d of the reactor 1 so as to confront the delivery ends of the main screws 6 and 7 and of the cooperative screws 8 and 9. At the lower end of the processed product exit port 31, a dewatering means 35 comprising a screw 32, a cutting device 33 and a perforated plate 34 is arranged. Drainage lines 36 and 37 are connected to the reactor 1 and to the dewatering section 35 at a lower portion thereof, respectively.

Adjacent to the dewatering means 35 is provided a dryer 38 into which hot blast is blown from a heating furnace 39, in order to effect drying and sterilization of the solid processed product 40. A processed product exit 41 and a gas discharge line 42 are provided.

A gas withdrawal line 43 is connected to the reactor 1 at its upper portion, which guides the gas formed in the reaction chamber to a gas storage tank 46 via a gas flow controller 44 and a gas purifying unit 45 and thence to the heating furnace 39.

A solar battery 47 serves for charging a storage battery 49 via a charging controller 48, which supplies electric currents to the heater 5, to the electric motors 21, 21a, 21b and to the solenoid valve 27.

For producing the processed organic product using the apparatus given above, the raw material 26 containing fibrous organic substance, introduced in the hopper 25, is supplied to the reaction chamber 2 of the reactor 1 via the raw material supply port 22 using the screw conveyer 24. The culture medium 29 is supplied, if necessary, together with a microorganism added, to the reaction chamber 2 via the culture medium supply port 23 by operating the solenoid valve 27. The supplying operations may be carried out either continuously or intermittently. Heating of the reactor 1 is effected by actuating the heating means 5 by the storage battery 49. The biological reaction is effected under an aerobic or a facultatively or strictly anaerobic condition by operating the main screws 6 and 7 by actuating the motor 21.

By actuating the motor 21, the shaft 13 is rotated and this rotary torque is transferred via the gears 19 and 20 to the shaft 14, whereby the shafts 13 and 14 are rotated in reverse sense to each other at a revolution ratio of 3:2. Since the main screws 6 and 7 are provided with the helical screw threads 6a and 7a of reverse turns to each other, the reaction mixture 3 is guided by the main screw 6 towards the direction shown by the arrow 'a' and by the main screw 7 towards the direction shown by the arrow 'b' while causing the reaction mixture 3 to be agitated thereby, on rotation of the main screws. Due to the difference in the configuration, in the revolution rate and in the pitch of the screw thread between the main screws 6 and 7, a corresponding difference in the moving speed of the guided reaction mixture occurs between them.

On the other hand, the cooperative screws 8 and 9 guide the reaction mixture 3 towards the directions indicated by the arrows 'c' and 'd' due to their helical screw threads 8a and 9a each in the turning sense reverse to that of the corresponding main screw 6 or 7.

Further, the gears 11 and 12 are provided each with teeth 11a or 12a protruding radially and extending each in parallel to the shaft 13 or 14, respectively, so that the reaction mixture 3 is forced to flow in the reaction chamber 2 by the rotations of these teeth so as to form vortexes swirling around the screw shafts 13 and 14 to effect agitation thereof, while thereby imparting a grinding effect to the solids contained in the reaction mixture, especially to the fibrous organic substances, upon passing through the interspaces between these gears 11 and 12. By this action, any solid matter sedimenting onto the bottom of the reaction chamber 2 will be thrown up with the resulting effects of the partial splitting and breaking thereof.

When the reaction mixture is guided by the rotation of the main screws 6 and 7, the fibrous substances will be moved while being entangled on the screw threads 6a and 7a. Due to the difference in the guiding speed between these main screws, the fibrous substances will be subjected to a splitting. In the interspaces between the confronting screw threads 6a and 7a, an action of breaking down is imparted to the fibrous substances due to a grinding effect brought about there, in addition to the splitting. In this way, a loosening of the fibrous substances may be caused with the simultaneous breaking down thereof into short fragments. Such a tendency is brought about by the difference in the guiding speed which may be caused either merely by the effect of the different screw pitch or only by the different revolution rate, while this tendency may be enhanced by the combination of such effects.

A part of the fragmented solids including the fibrous substances formed by the main screws 6 and 7 is scattered in the reaction mixture 3 by the agitating action of the main screws 6 and 7 and is digested by the biological or biochemical reaction. The fibrous substances guided up by the main screws 6 and 7 are then forced to move back downwards by the action of the cooperative screws 8 and 9 as indicated by the arrows 'c' and 'd' and re-dispersed in the reaction mixture 3, whereby they are subjected again to the biological or biochemical reaction.

By performing the biological or biochemical reaction in the manner as described above, the fibrous substance is subjected to a partial digestion by, for instance, cellulose-decomposing bacteria, protozoans and eumycetes, while other organic substances are decomposed also by other bacteria and so on. In the reaction mixture, the microorganisms including protozoans, bacteria and yeasts will proliferate at high densities, by which injurious organisms, such as virulent bacteria and injurious insects, are taken up to make the product innocuous, while plant tissues are digested by herbivorous protozoans, whereby the resulting metabolites of the microorganisms etc. will accumulate as useful ingredients, whereby processed organic products having high abilities for retaining water and for permeating gases can be produced.

A part of the solids in the mass of the reaction mixture guided up by the main screws 6 and 7 is subjected to a pressing action upon collision against the mass of the reaction mixture guided down by the cooperative screws 8 and 9, whereby a dewatering effect is brought about and the processed product taken out through the processed product exit port 31 can be brought into a compressed and dewatered mass. The excess portion of the reaction mixture is withdrawn by overflowing also via the processed product exit port 31. The processed products collected in the product exit port 31 in solid and liquid forms are then subjected to dewatering in the dewatering section 35.

In the dewatering section 35, solids are squeezed by the rotation of the screw 32 and are dewatered. The thereby separated liquid part is withdrawn via the drainage line 37 as a processed liquid product, from which bacteria cells, bacteria cell protein and metabolites are recovered by a separation means, such as a centrifuge, etc., as useful organic processed products. The pressed and dewatered solid mass from the screw 32 is introduced into a dryer 38 after it is cut into small pieces by the cutting device 33 under extrusion through the pores of the perforated plate 34.

The gas produced in the reaction chamber 2 is rich in methane, hydrogen gas and carbon dioxide gas and collected via the gas withdrawal line 43 under control of the pressure by the gas flow controller 44 into the gas storage tank 46, after having been freed from impurities through the gas purifying unit 45. The gas stored in the gas storage tank 46 is sent to the heating furnace 39 to burn it therein, from which the resulting hot combustion gas is introduced into the dryer 38 to cause drying and sterilization of the solid processed product 40 accumulated therein. The spent gas exhausted from the dryer via the gas discharge line 42 may be utilized also for heating the reactor 1.

The resulting dried solid mass of the processed product 40 is taken out via the product exit 41 as the solid processed organic product, which may be used, for example, as the industrial raw materials, food components, medicinal components, fodder raw materials and raw materials for soil conditioners. In the case of using the solid processed organic product as a raw material for a soil conditioner, it may further be processed by growing therein earthworms or soil microbes, such as root zone bacteria, in an additional process step to produce the final product.

The porous lining 4 installed in the reaction chamber 2 serves for supporting the microorganisms participating in the biological reaction and reveal a function of replenishing the reaction mixture with the cells of microorganisms retained in the pores and indentations in the porous lining to support the biological reaction when the cell population of the microorganisms in the reaction mixture is decreased. It may serve further for preserving the microorganisms by retaining them in the pores in order to prepare for a possible draining out of the reaction mixture for repair of the reactor 1 or the like, so as to permit restoration of the biological reaction by growing the microorganisms held therein.

By installing the cylindrical reactor 1 having main screws 6 and 7 in an inclined posture described above, the guiding and the agitation of the reaction mixture in the reaction chamber 2 can be realized in an efficient manner without causing any accumulation of solid matter in the reaction chamber 2 together with simultaneous attainment of easy withdrawal of the processed organic product. When adjustment of the grain size of the solid processed product is to be incorporated, a means for effecting classification or sifting, such as a screen or the like, may be arranged at an upper portion of the processed product exit port.

For heating the reactor 1, the gas generated in the reaction chamber 2 may be utilized as the main heat source. The constructions of the main and cooperative screws 6, 7, 8 and 9 may be changed to those of other designs than those shown in the Figures, such as for example, a spiral miter gear having a construction in which several spiral bevel gear wheels are put one over another, a puddle screw and a screw with blades. Also, other means, such as means for supplying the raw material and for dewatering the processed product, as well as variations in the construction, may be permitted. By the apparatus and the process for producing processed organic product described above, a biological or biochemical reaction is carried out in a reactor provided therein with a plurality of main screws arranged side by side so as to confront the peripheral edges of the screw threads of neighboring main screws with each other and so as to each act to forward the reaction mixture in substantially the same direction at a velocity different from each other, by supplying a raw material containing fibrous organic substance to the reactor and effecting the biological or biochemical reaction while subjecting the fibrous organic substance to splitting and breaking down by the main screws, whereby the fibrous organic substances contained in the raw material can be loosened and subjected to axial splitting and breaking down into short fragments, thus permitting the supplying of the apparatus with raw materials containing longer fibrous organic substances, such as plant bodies, directly as such, for realizing a physico-chemical and biological or biochemical reaction, while eliminating injurious microbes, and to produce a processed organic product containing organic matters superior in nutrient balance for use as, for example, raw materials for industrial products, food components, raw materials for fodders and soil conditioners, and exhibiting high performances in water-retentiveness and in gas permeability.

Figure 3:
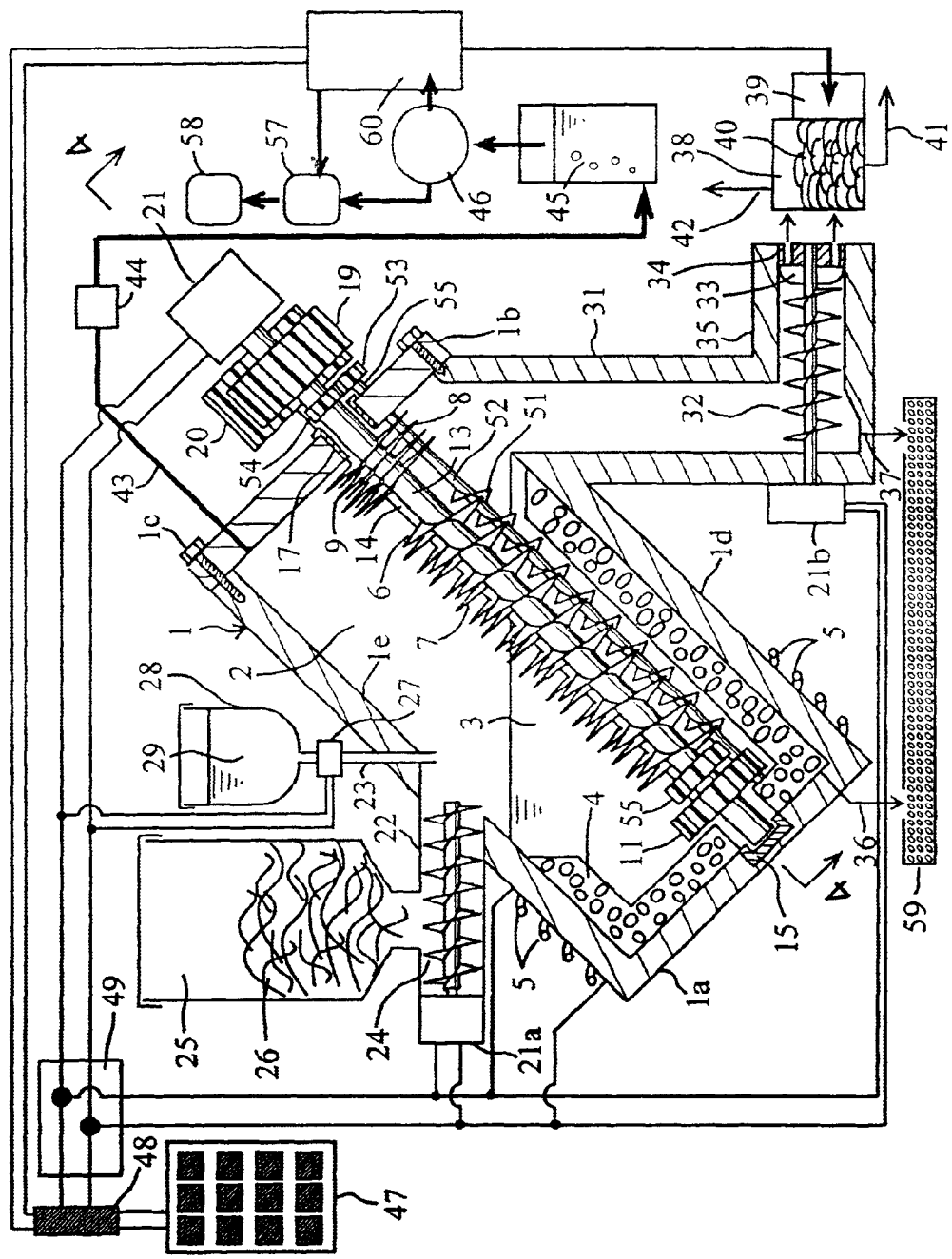
FIG. 3 shows another embodiment of the apparatus for producing the processed organic product according to the present invention in a vertical sectional view.
Figure 4:
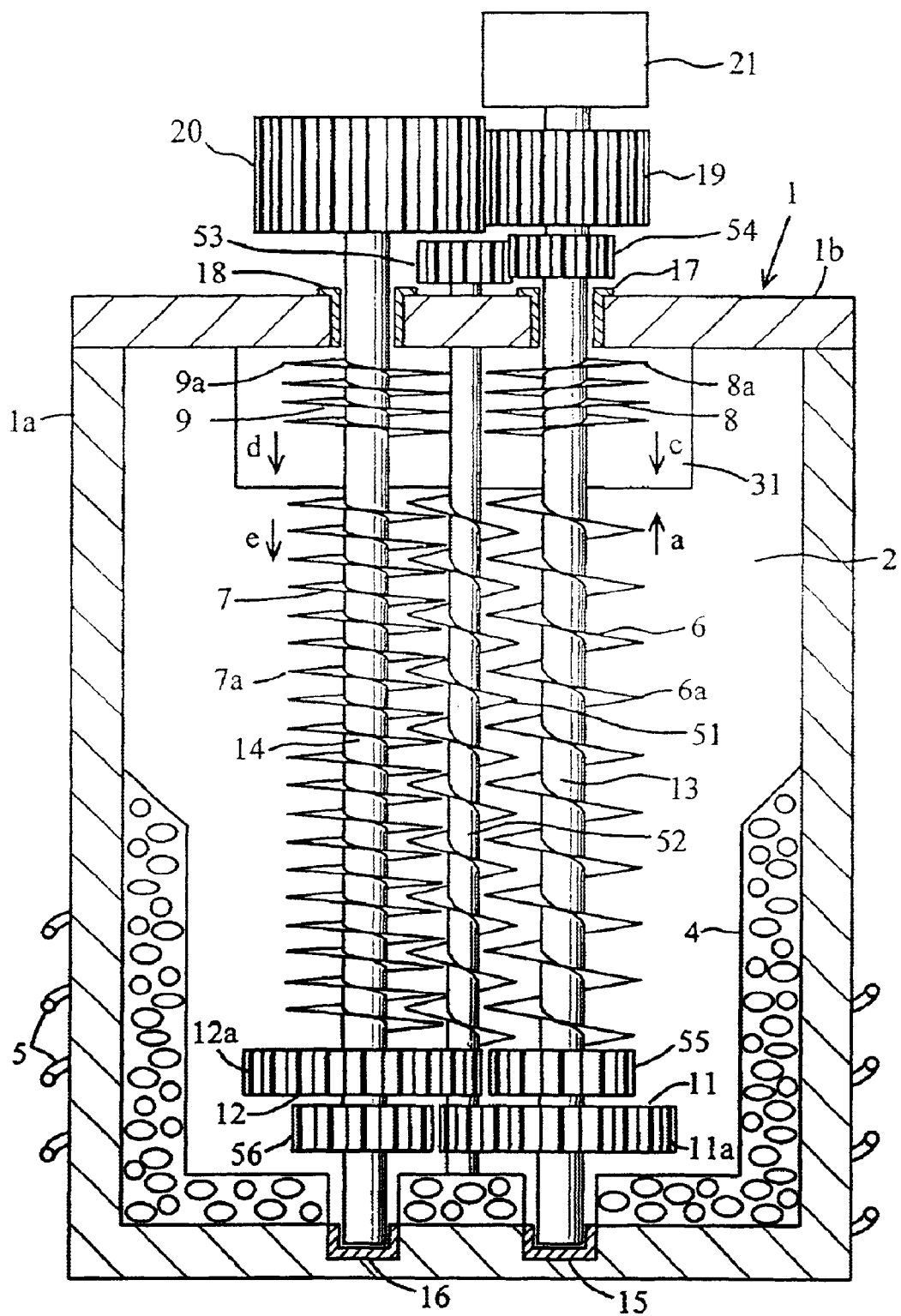
FIG. 4 is the section along the line 4—4 of FIG. 3.

FIG. 3 shows another embodiment of the apparatus for producing processed organic product according to the present invention in a vertical section. FIG. 4 is a vertical sectional view of the apparatus shown in FIG. 3 along the line 4—4. In these Figures, the numerals which are the same as those of FIGS. 1 and 2 represent the same or corresponding parts and members.

While the apparatus shown in FIGS. 3 and 4 has a construction nearly the same as that shown in FIGS. 1 and 2, the main screws 6 and 7 each impart to the reaction mixture a force acting to forward the reaction mixture in the reverse direction to each other (in the direction indicated by the arrow 'a' or 'e'), since they have screw threads of the same helical turn. In the apparatus given above, the reaction mixture will be forwarded substantially in the direction indicated by the arrow 'a' due to the difference in the revolution rate and in the helical pitch. An auxiliary screw 51 is additionally installed between the two main screws 6 and 7 in parallel thereto so as to act to forward the reaction mixture in the reverse direction to that by the main screws 6. The auxiliary screw 51 has a helical screw thread turning in the same sense as that of the main screw 6 and is rotated in the reverse sense to that of the screw shaft 13 by the gearing connection of a gear 53 disposed at the end of the shaft 52 of the auxiliary screw under engagement with a gear 54 arranged on the shaft 13. The shafts 13 and 14 are each provided with a gear 55 or 56 disposed in parallel to the gear 11 or 12, respectively, leaving a gap therebetween. A carbon dioxide liquefying unit 57 is connected to the gas storage tank 46 directly or after passing through a gas-power generator 60 and communicates with a dry ice production unit 58 to supply the liquefied carbon dioxide thereto. The drainages 36 and 37 open into a compost tank 59 in which cultivation soil containing living organisms, such as earthworms, microbes, plants etc., is contained.

In the apparatus described above, a processed organic product is produced in a similar manner as in the apparatus shown in FIGS. 1 and 2, while the reaction mixture is now forwarded by the auxiliary screw 51 in the reverse direction (in the same direction as indicated by the arrow 'c') to that by the main screw 6. By this action, the heavy ingredients in the reaction mixture sedimented onto the lower face of the reaction chamber 2 will be forwarded down towards the bottom of the reaction chamber and are here subjected to the agitating action by the rotating gears 11, 12, 55 and 56 and thrown up into the functional range of the main screws to subject them to the action of breaking down under convection. Thus, even large sized or heavy solid matters present may be disintegrated and circulated. The gas leaving the gas purifying unit 45 is sent to the gas storage tank 46 directly or after passing through the gas-power generator 60, before carbon dioxide gas contained therein is liquefied in the carbon dioxide liquefying unit 57. The liquefied carbon dioxide is used for producing dry ice in the dry ice production unit 58. The resulting dry ice is utilized, for example, for destroying bacterial cells obtained as one of the processed organic products and for asepsis of the solid product. A part of the gas generated in the reaction chamber is sent to the gaspower generator 60 to utilize it for generating electric energy which is stored in the storage battery 49 and is used as the power source for the electric motors 21, 21a and 21b and for others. The heat wasted from the power generator may be utilized for heating the reactor 1. The liquid processed products obtained from the drainages 36 and 37 are supplied to the compost tank 59, where they are utilized for cultivating soil organisms, such as earthworms etc., microorganisms, plants and so on in a cultivation soil composed of, for example, porous ceramic substances etc. The proliferated earthworms, microorganisms, plants and so on are fractionally collected from the cultivation soil by making use of the difference in the specific weight, in the volume or so on and are utilized for preparing fodders, etc. A part of the separated plants may be reused as raw materials.

Figure 5:
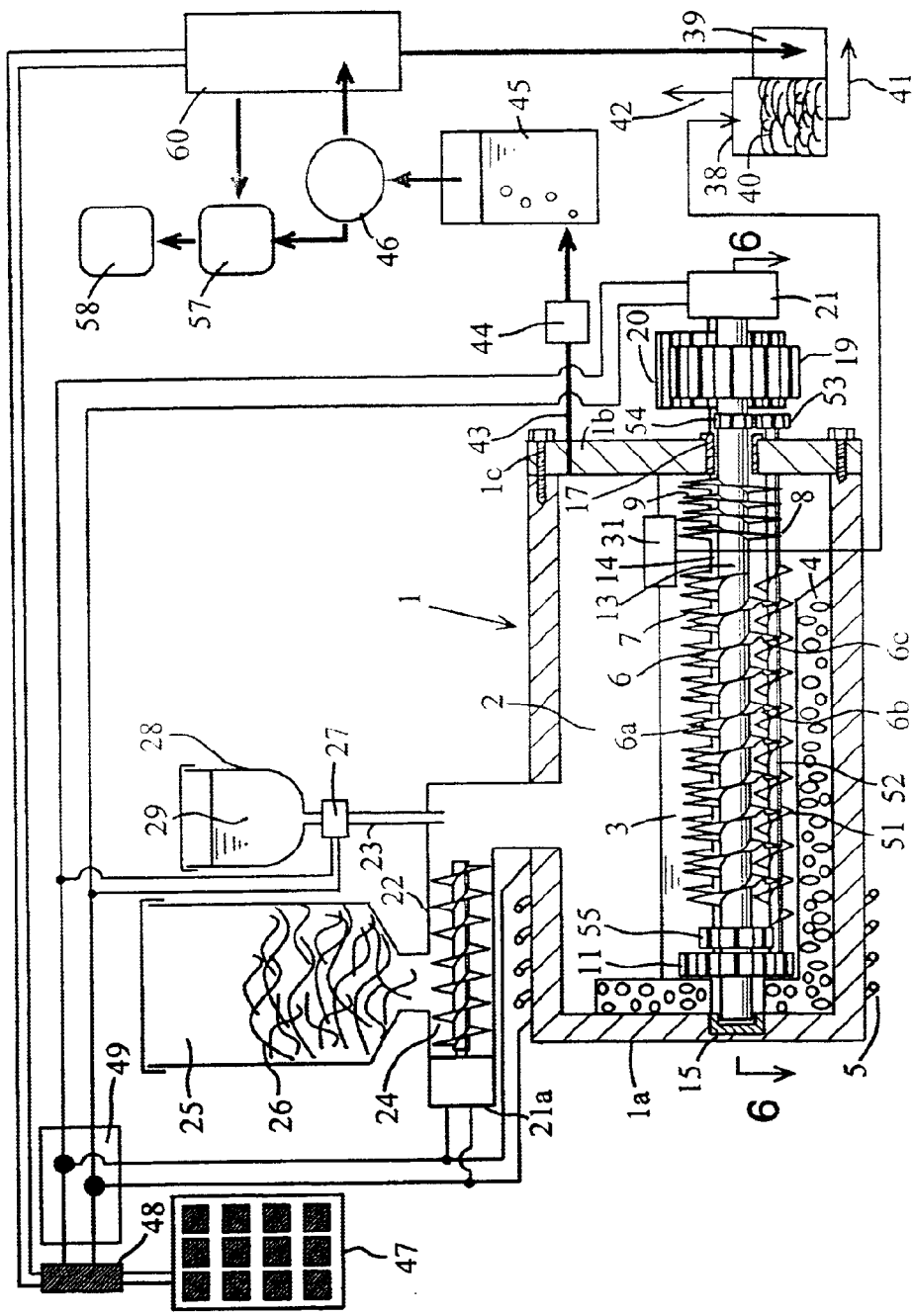
FIG. 5 shows a further embodiment of the apparatus for producing the processed organic product according to the present invention in a vertical sectional view.
Figure 6:
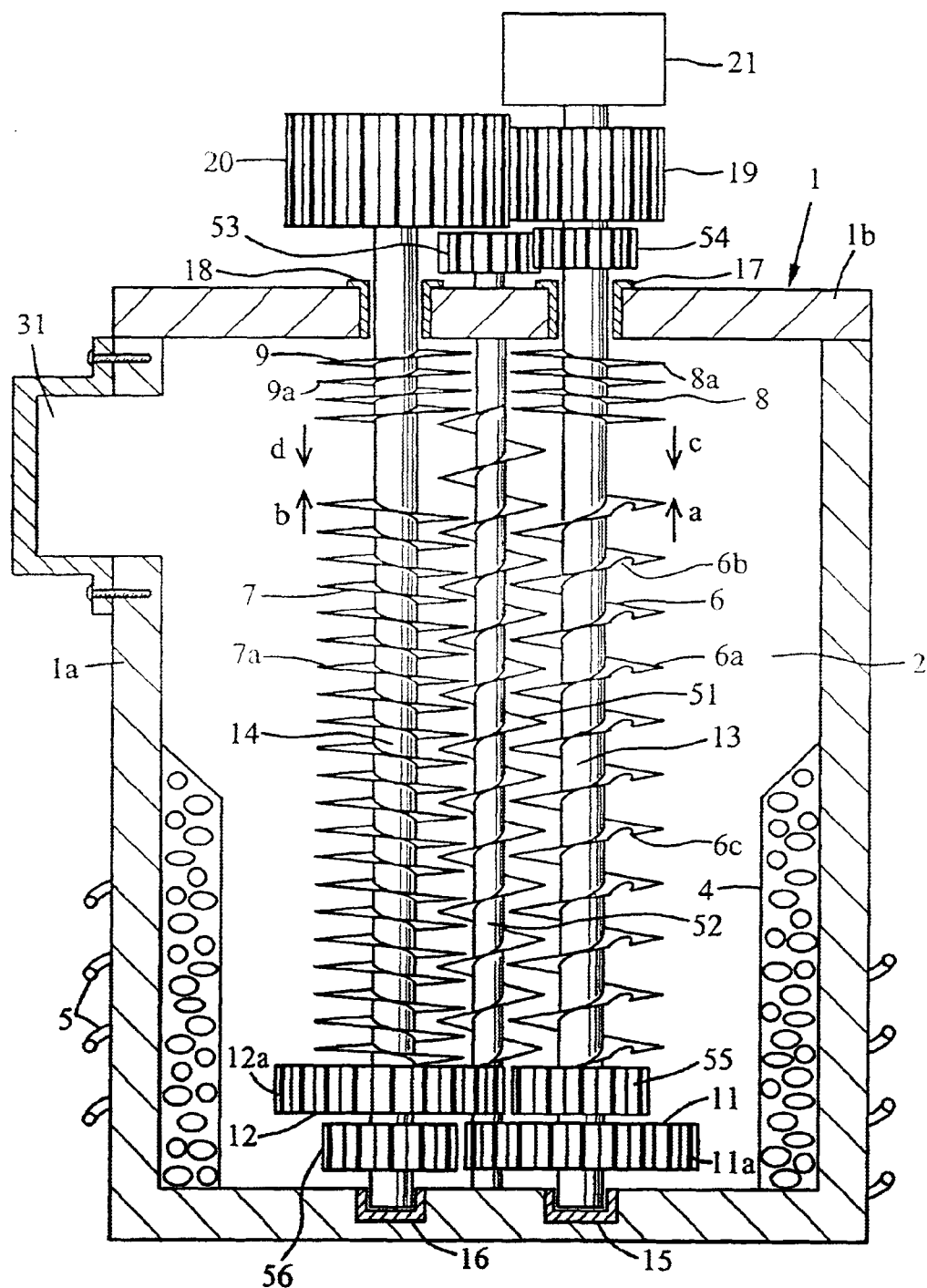
FIG. 6 is the section along the line 6—6 of FIG. 5.

FIG. 5 shows a further embodiment of the apparatus for producing the processed organic product according to the present invention in a vertical section. FIG. 6 is a sectional view of the apparatus shown in FIG. 5 along the line 6—6.

While the apparatus shown in FIGS. 5 and 6 is constructed similarly to the apparatus shown in FIGS. 3 and 4, it differs therefrom in the point that the reactor 1 and, thus, the screws 6, 7, 8, 9 and 51 etc. are arranged in horizontal posture, in the point that the main screw 7 is arranged in a helical turn reverse to that of the main screw 6 and in the point that the helical screw thread 6a of the main screw 6 is provided with hooking parts 6c formed by cut-in indentations 6b to facilitate capturing of fibrous substances. The arrangements of constituent elements of the reactor 1 are almost the same as those in the apparatus of FIGS. 3 and 4. The processed product exit port 31 is arranged at a level permitting the maintenance of the liquid level of the reaction mixture 3 at a predetermined position and opens into the reaction chamber 2 on the side wall at a position between the main screws 6, 7 and the cooperative screws 8, 9, while the other end thereof communicates with the dryer 38, wherein the dewatering means 35 are not shown.

The production of the processed organic product using the above apparatus is carried out in the same manner as in the apparatus of FIGS. 3 and 4. According to this embodiment, support of the reactor 1 is easy due to the horizontal arrangement thereof, permitting the designing of the apparatus in a smaller size while keeping a reaction performance comparable to that of the apparatus of FIGS. 3 and 4.

What is claimed is:

1. A process for producing a processed organic product, comprising the steps of:

providing a reactor containing a plurality of main screws arranged side-by-side such that peripheral edges of screw threads of neighboring screws confront each other and each of the main screws forward a reaction mixture in a first direction at a different velocity from each other and cooperative screws provided at a delivery end of the main screws for forwarding the reaction mixture in a direction opposite to the first direction and compressing a processed product said cooperative screws being axially aligned with the screws;

supplying a raw material containing a fibrous organic substance to the reactor;

effecting a biological or biochemical reaction in the reactor while subjecting the fibrous organic substance to splitting and breaking by the main screws; and removing the processed organic product from the reactor in a compressed state.

2. The process of claim 1, wherein the reactor additionally contains auxiliary screws for forwarding the reaction mixture in the direction opposite to the first direction for facilitating the convection of the reaction mixture provided neighboring the main screws.

3. The process of claim 1, wherein the reaction is either an anaerobic or aerobic reaction.

4. An apparatus for producing a processed organic product, comprising:

a reactor containing a plurality of main screws arranged side-by-side such that peripheral edges of screw threads of neighboring screws confront each other and each of the main screws forwards a reaction mixture in a first direction at a different velocity from each other and cooperative screws provided at a delivery end of the main screws for forwarding the reaction mixture in a direction opposite to the first direction and compressing a processed product said cooperative screws being axially aligned with the main screws;

a raw material supply port for supplying a raw material containing a fibrous organic substance to the reactor; and a processed product exit port provided on the reactor for permitting the removal of the processed product at a position neighboring the delivery end of the main screws.

5. The apparatus of claim 4, wherein the reactor is disposed in either an inclined or a horizontal posture and the plurality of main screws are arranged along a lower wall face of the reactor.

6. The apparatus of claim 4, wherein neighboring main screws have helical screw threads and are rotated in a reverse rotational sense to each other.

7. The apparatus of claim 4, wherein the screw thread configuration, pitch and/or rate of screw revolution are chosen such that each of the main screws forwards the reaction mixture at a different velocity from each other.

8. The apparatus of claim 4, wherein the reactor additionally contains auxiliary screws for forwarding the reaction mixture in the direction opposite to the first direction for facilitating the convection of the reaction mixture provided neighboring the main screws.

9. The apparatus of claim 4, wherein the reactor additionally comprises a structure having spaces for supporting microorganisms therein.

\* \* \* \* \*

UNITED STATES PATENT AND TRADEMARK OFFICE
CERTIFICATE OF CORRECTION

PATENT NO. : 6,653,123 B2
DATED : November 25, 2003
INVENTOR(S) : Akira Horigane It is certified that error appears in the above-identified patent and that said Letters Patent is hereby corrected as shown below:

Column 14,
Line 60, change "aligned with the screws" to -- aligned with the main screws --.

Signed and Sealed this

Fifteenth Day of June, 2004

JON W. DUDAS
*Acting Director of the United States Patent and Trademark Office*